United States Patent
Chuang et al.

(10) Patent No.: US 8,803,485 B2
(45) Date of Patent: Aug. 12, 2014

(54) HIGH EFFICIENCY ADAPTIVE POWER CONVERSION SYSTEM AND METHOD OF OPERATION THEREOF

(75) Inventors: Charles Chuang, Taipei (TW); Hsien-His Juan, Taipei (TW); David YuanJei Tse, Taipei (TW)

(73) Assignee: Alieva, Inc., Redwood City, CA (US)

( * ) Notice: Subject to any disclaimer, the term of this patent is extended or adjusted under 35 U.S.C. 154(b) by 466 days.

(21) Appl. No.: 12/732,162

(22) Filed: Mar. 25, 2010

(65) Prior Publication Data

US 2010/0244778 A1   Sep. 30, 2010

Related U.S. Application Data

(60) Provisional application No. 61/163,225, filed on Mar. 25, 2009.

(51) Int. Cl.
*H02J 7/04* (2006.01)

(52) U.S. Cl.
USPC .............................. 320/150; 307/19

(58) Field of Classification Search
USPC ........... 307/18, 19, 23, 29, 38, 39, 58, 64, 65, 307/80, 82, 86; 320/138, 150–154; 363/65, 363/69, 71
See application file for complete search history.

(56) References Cited

U.S. PATENT DOCUMENTS

| | | | | |
|---|---|---|---|---|
| 5,428,523 A | * | 6/1995 | McDonnal | 363/71 |
| 5,598,085 A | * | 1/1997 | Hasler | 320/145 |
| 5,625,546 A | * | 4/1997 | Schaal | 363/71 |
| 6,154,381 A | * | 11/2000 | Kajouke et al. | 363/65 |
| 2009/0091187 A1 | * | 4/2009 | Tardy | 307/38 |
| 2009/0115252 A1 | * | 5/2009 | Caraghiorghiopol et al. | 307/48 |

\* cited by examiner

*Primary Examiner* — Melissa Koval
*Assistant Examiner* — Daniel Miller
(74) *Attorney, Agent, or Firm* — Womble, Carlyle, Sandridge & Rice

(57) ABSTRACT

A power conversion system is disclosed. The system comprises a plurality of power conversion modules and a controller that turns on/off each power conversion module separately based on changing load conditions, and manages to keep each power conversion module running at its peak efficient state.

19 Claims, 9 Drawing Sheets

Power supply module reallocation for cooling and reliability

HIGH EFFICIENCY ADAPTIVE POWER CONVERSION SYSTEM AND METHOD OF OPERATION THEREOF

CROSS REFERENCE TO THE RELATED APPLICATION

The present invention claims priority to U.S. provisional application Ser. No. 61/163,225, filed Mar. 25, 2009, the entirety of which is hereby incorporated by reference.

FIELD OF THE INVENTION

Present invention relates to multiple power conversion systems used from main source, typically of 3-phase 480V AC to actual load and, in particular, but not exclusively, provides a high efficiency AC to DC and DC to DC battery charging system and high efficiency DC to AC inverter system for Uninterruptible power supply (UPS) application.

BACKGROUND OF THE INVENTION

We live in a world that requires a lot of electricity. But few people realize the wasteful process it takes from AC mains to actual load. For a large computer data center with 500 kW requirement, additional 335 kW are lost between the AC mains to the CPU and core logic on the PC board. The 480V AC to 208V AC transformer is 99% efficient. The AC Uninterruptible Power Supply (UPS) is 92% efficient. Distribution of AC power is 99% efficient. Commercial grade AC-DC 12V power supply is 75% efficient, and finally the conversion efficiency from DC 12V to 1V is 88% efficient. When the power is coming from the back up batteries of the UPS, the battery charger loses another 10% efficiency. It is clear that 1% efficiency increase through the power conversion process has significant impact across the entire nation. The crux of the problem is the same for all power conversion systems: The power conversion system capacity is too large for most practical loads, therefore their operation is inefficient and not optimized. When load requirement drops, the power conversion system is not adaptive, and loses even more in efficiency. Rather than tackle the entire power conversion chain, we will focus in detail on how the present invention works for an AC to DC battery charging system. Later on, explanation on present invention to DC to DC battery charging system and DC to AC inverter will be given. It would be obvious then that adaptive power conversion system works for all power conversion systems with known characteristic loads.

The demand for automobiles with electric propulsion is increasing due to the diminishing oil supply and concerns on Carbon emission to the atmosphere. A typical electric car today has a battery capacity of 22-50 Kilo-Watt-Hour (KWh). The battery packs can be charged by regeneration of brake energy, charged by burning gasoline, or preferably charged from the nation's electric grid via an AC to DC power supply or indirectly, DC to DC power supply. When a large fleet of electric cars are in operation, the energy transfer efficiency of the electric car battery charger can make a big difference in energy requirement. For example, a one-percent difference in battery charger energy transfer efficiency for a fleet of 100,000 cars, each having 32 KWh capacity, is 32 MWh for each charging operation, not a small demand when compared with a small coal-fired power plant of a 50 MW power generating capacity.

However, prior art battery charger can only manage energy transfer efficiency close to 90%, even with the latest resonant converter power supply technology. It is desirable to have a battery charging system with significantly better energy transfer efficiency. It is desirable to have a battery charging system that is both high efficient and high reliability. It is also desirable to have a battery charging system that is inherently redundant with graceful degradation. It is also highly desirable to have a battery charging system that can charge more than one battery pack at the same time.

SUMMARY OF THE INVENTION

A power conversion system is disclosed. The system comprises a plurality of power conversion modules and a controller that turns on/off each power conversion module separately based on changing load conditions, and manages to keep each power conversion module running at its peak efficient state.

According to one aspect of the invention, it is to provide a power conversion system for receiving an input electric power and converting the input electric power into an output electric power which is to be output to a load. The power conversion system comprising: a plurality of power conversion modules operating in a cooperative manner, each having a maximum output power level, wherein each of power conversion modules has a non-activated state and an activated state where the corresponding power conversion module has a conversion efficiency varying according to a ratio of a practical output power level that is to be supplied to the load over the maximum output power level; and a detector and controller module for detecting a total output power level needed by the load and determining a number of power conversion modules placed in the respective activated states thereof according to the detected total output power level, so that when the total output power level needed by the load is lower than a sum of the maximum output power levels of all the power conversion modules placed in the activated states beyond a predetermined level, the power conversion modules supply electric power to the load in a cooperative manner that at least one of the power conversion modules placed in the activated states is switched to the non-activated state thereof.

According to another aspect of the invention, it is to provide a power conversion method for use in a power conversion system for receiving an input electric power and converting the input electric power into an output electric power which is to be output to a load. The power conversion system comprises a plurality of power conversion modules operating in a cooperative manner and a detector controller module. Each of the power conversion modules has a maximum output power level and has a non-activated state and an activated state where the corresponding power conversion module has a conversion efficiency varying according to a ratio of a practical output power level that is to be supplied to the load over the maximum output power level. The power conversion method comprises the steps of:

a) transmitting the output electric power to the load and using the detector and controller module to detect a total output power level needed by the load;

b) enabling the detector and controller module to determine an output setting according to the total output power level, wherein the output setting is determined such that the power conversion modules supply electric power to the load in a cooperative manner that at least one of the power conversion modules is placed in the non-activated state thereof; and c) controlling the respective states of the power conversion modules according to the output setting.

The foregoing and other features and advantages of illustrated embodiments of the present invention will be more readily apparent from the following detailed description, which proceeds with reference to the accompanying drawings.

PRIOR ART

FIG. 1 is a graph of load, or power output, vs. power transfer efficiency for a resonant converter power supply.

From 70% to 92% of a rated load, the power supply has high transfer efficiency of 93.5% or higher. The efficiency drops below 90% at 30% load, and falls to zero with no load.

FIG. 2a is a graph of current and voltage of a Lithium ion battery being charged vs. time. The time span has two distinctive regions. When a depleted battery is being charged, time span I, the battery voltage is low and the battery charger is in constant current mode to deliver power to the battery, and the battery voltage rises linearly over time. In time span II, the battery voltage has risen close to its limit, and the charging current drops rapidly downward. The battery voltage creeps upward slowly and can be characterized as in constant voltage mode. The charging process terminates when the remaining current drops to about 5% of the initial constant current value. Time span I and II are very typical of battery charging regardless of battery technology.

FIG. 2b is a graph of charging power of a Lithium ion battery vs. time. This is calculated by multiplying the voltage and current at each time spot then scaled in proportion to the optimal battery charger power capacity. Even with this optimal charger, the charging power ratio is staying at the efficient 70% to 92% range for only a short fraction of time. For most of the charging period the power transfer efficiency is not good, getting worse toward the end of the cycle, when the battery charger is only operating near 5% power ratio or 47% efficiency.

FIG. 3 divides the charging cycle into 16 time segments, computes the average power ratio in each segment, as a percentage of the maximum power from the optimal charger, and uses FIG. 1 to figure out the power efficiency for each segment. The total charge cycle power efficiency is the average over the 16 segments. The computation is summarized in Table 1.

power supply unit 140, controlled by a controller 120 who limits the charging current at the beginning of the charge cycle, switches to constant voltage mode toward the end. The controller also detects the end of the charging cycle and terminates the charging operation via a switch 124. The controller also sets the upper limit on voltage to prevent over voltage charging.

TABLE 1

Efficiency computation for a prior art battery charging system

| | Time Segment | | | | | | | | | | | | | | | | |
|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | Overall |
| Average Power as % of charger | 28.0 | 45.0 | 62.0 | 78.0 | 86.0 | 66.0 | 47.5 | 35.0 | 26.5 | 20.5 | 16.5 | 13.0 | 10.3 | 8.5 | 6.8 | 5.5 | |
| Efficiency % | 89.70 | 91.30 | 92.90 | 93.80 | 93.80 | 93.10 | 91.55 | 90.25 | 89.50 | 88.80 | 87.70 | 86.50 | 85.50 | 72.68 | 57.71 | 47.03 | 84.488 |

The computation shows the entire battery charge cycle efficiency is only 84.5%. If the power capacity of the charger is any smaller, the efficiency can increase a bit, at the risk of reduced reliability of the charger operation. If the capacity of the charger is any larger, then the efficiency will drop even more. Having too long of the charging cycle in poor power transfer regions is the key reason why it is difficult for prior art battery charging system to achieve high charging efficiency.

Figure 4:
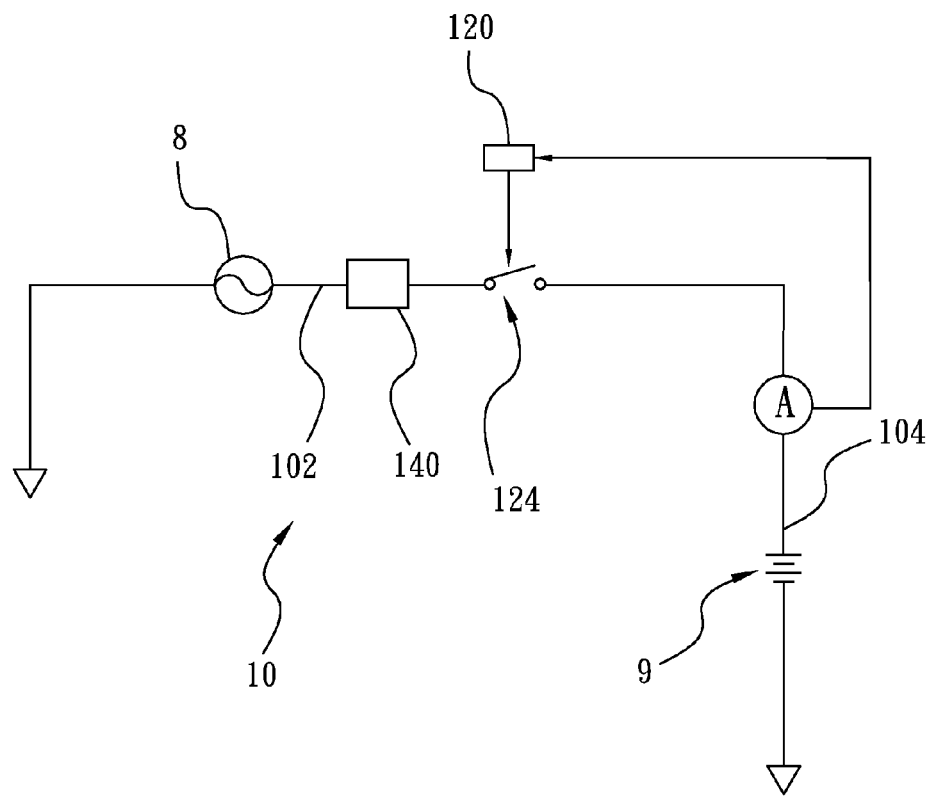
FIG. 4 is a block diagram illustrating the topology of prior art battery charging system.
Figure 12:
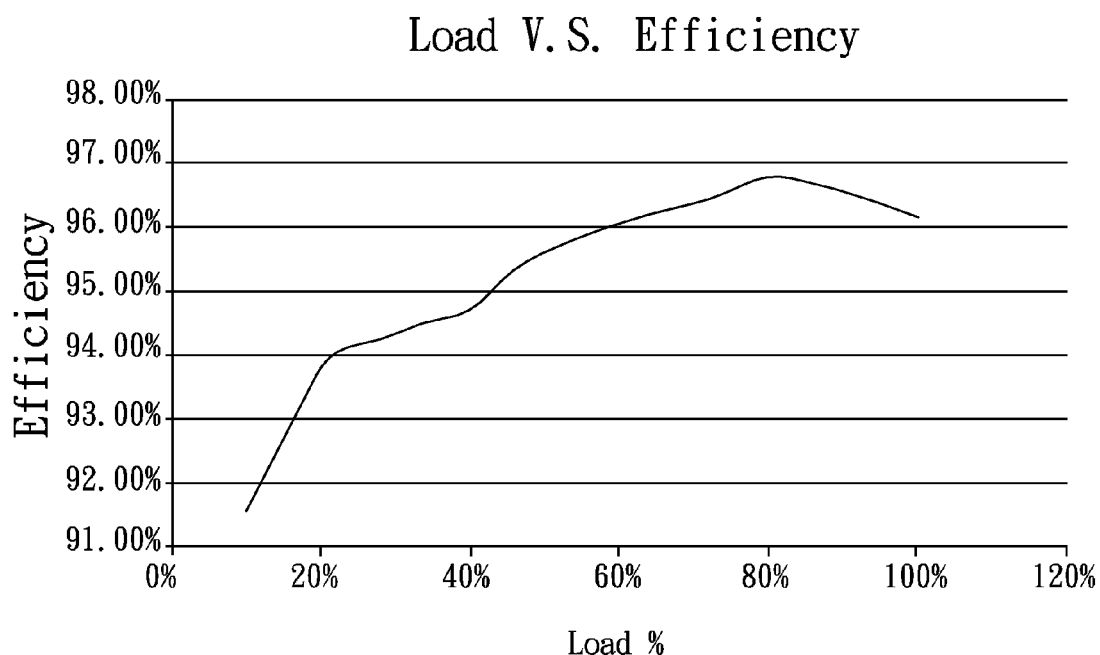
Figure 13:
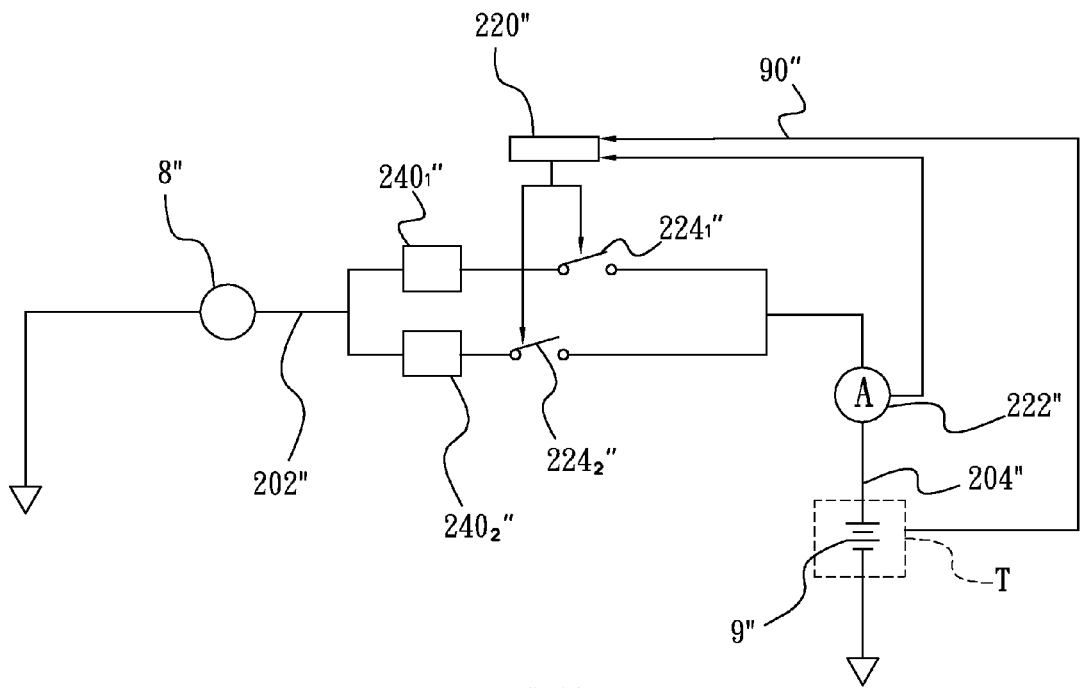

FIG. 4 is a block diagram illustrating the topology of prior art battery charge system 10 that has its input connected to AC inlet 102, and output 104 connected to battery pack 9. It has a FIG. 12 is a graph of load, or power output, vs. power transfer efficiency for a DC (400V)-DC power supply FIG. 13 is an electronic circuit block diagram of another preferred embodiment, showing the DC to DC power transfer structure utilizing the power conversion devices with the transfer characteristics shown in FIG. 12

Figure 14:
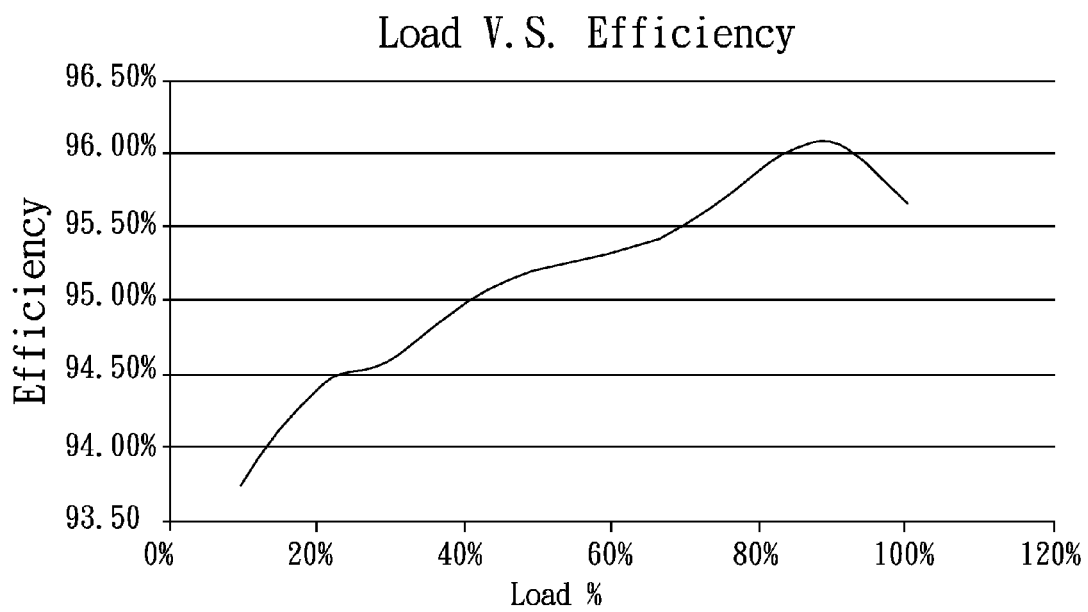
Figure 15:
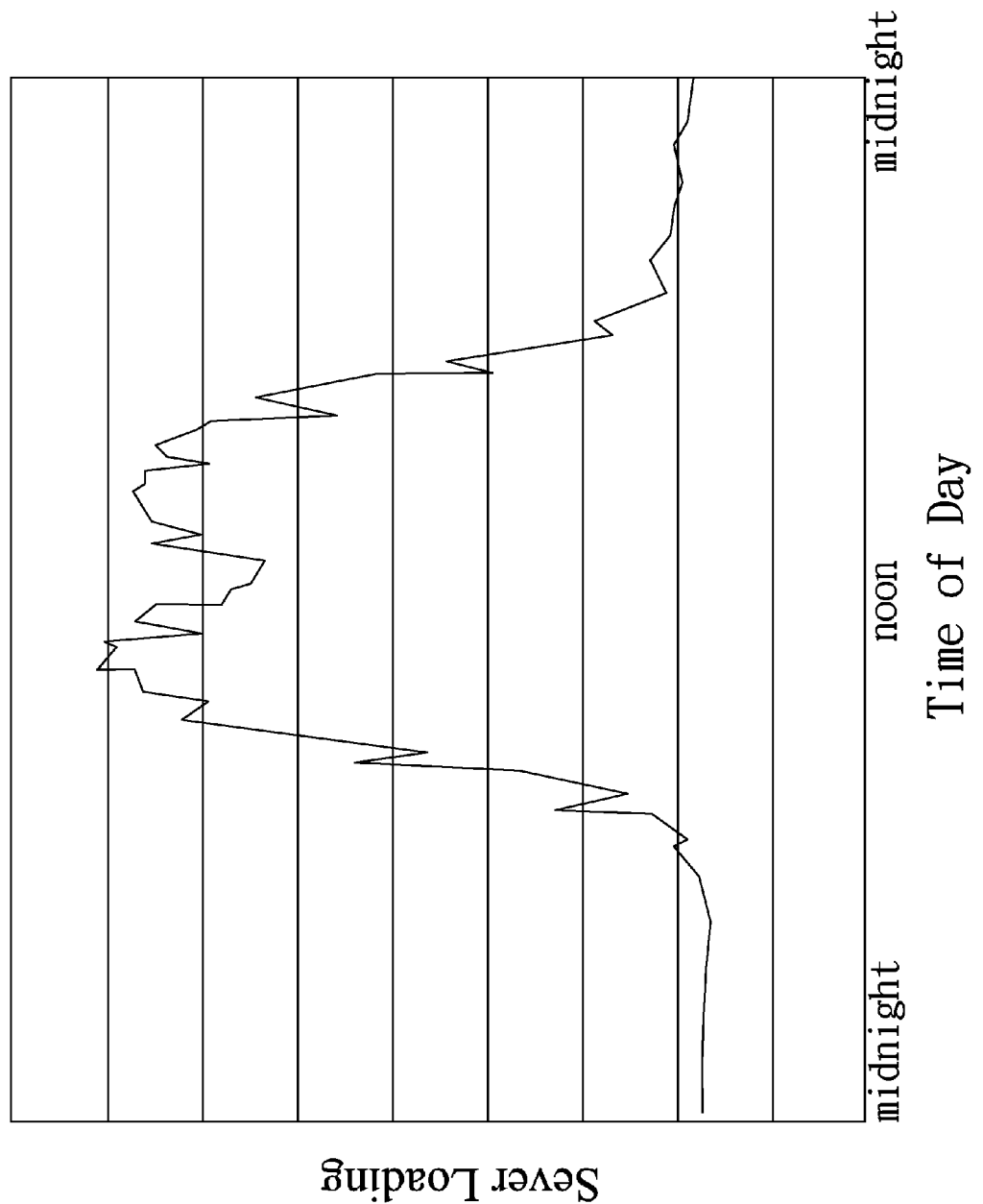

FIG. 14 is a graph of load, or power output, vs. power transfer efficiency for a DC (400V)-AC power supply FIG. 15 is a sample server loading in a big company across a work day

DETAILED DESCRIPTION OF THE ILLUSTRATED EMBODIMENTS

The following description is provided to enable any person having ordinary skill in the art to make and use the invention, and is provided in the context of a particular application and its requirements. Various modifications to the embodiments will be readily apparent to those skilled in the art, and the principles defined herein may be applied to other embodiments and applications without departing from the spirit and scope of the invention. Thus, the present invention is not intended to be limited to the embodiments shown, but is to be accorded the widest scope consistent with the principles, features and teachings disclosed herein.

Battery Charger Topology of the Present Invention

Figure 5:
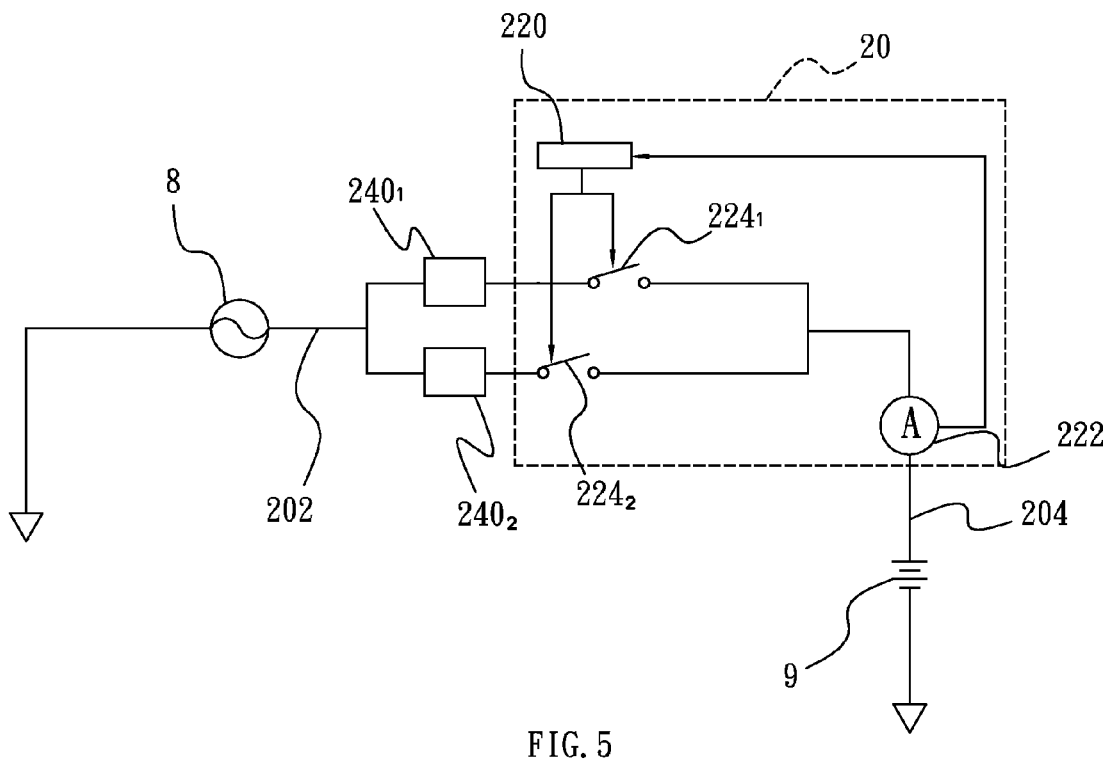
FIG. 5 shows a preferred embodiment of present invention battery charging system topology with single output.

FIG. 5 shows a preferred embodiment of present invention battery charging system topology with single output 202 that has its input connected to AC inlet 8, and output 204 connected to battery pack 9. It has two power supply modules 2401 and 2402, connecting to the battery pack by corresponding switches 2241, 2242 and controlled by a controller 220 who limits the charging current at the beginning of the charge cycle, to constant voltage mode toward the end. The measurement/control module 20 in this example includes controller 220, and switches 2241, 2242, also includes ammeter 222 to detect the end of the charging cycle and informs controller 220, so the controller may terminate the charging operation by opening both switches 2241 and 2242. The external ammeter may be replaced by build-in ammeters within power conversion modules.

Each power supply module 2401 or 2402, has only 50% of the rated power needed to charge the battery pack 9 in prescribed time, and both power supply Modules 2401 and 2402 must be combined together in order to fulfill the charging time requirement. However, when the battery charging power demand is less than 50%, then one of the two power supply modules 2401 or 2402 is turned off or put into very low power dissipating mode, and its output switch, 2241 or 2242 opened. The battery charging power demand, when presented to a power supply module with half the rated power, has the effect of doubling the rated load, and higher energy transfer efficiency.

By adaptively shut off power supply modules based on load conditions, system efficiency is improved. When the efficiency computation is done on this new topology, the overall charging efficiency has increased significantly. 4 out of the 16 charging time segments has load ratio higher than 50%, so both power supplies are active, and the efficiency is the same as prior art system. However, 12 out of the 16 charging time segments has load ratio lower than 50%, so only one power supply is active, and the efficiency of these segments are higher, and the overall efficiency rises to 91.1 percent as shown in Table 2. It is important to note that two power supply modules can be integrated onto a single package, even sharing front-end EMI filters and bridge rectifiers. The present invention only stipulates that at a circuit module level, it can be independently controlled.

TABLE 2

Efficiency computation for a preferred embodiment with two power supply modules

| | | Time Segment | | | | | | | | | | | | | | | | |
|---|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 | Overall |
| PS Module #1 | 50% capacity | off | off | 62.0 | 78.0 | 86.0 | 66.0 | off | off | off | off | off | off | off | off | off | off | |
| PS Module #2 | 50% capacity | 56.0 | 90.0 | 62.0 | 78.0 | 86.0 | 66.0 | 95.0 | 70.0 | 53.0 | 41.0 | 33.0 | 26.0 | 20.5 | 17.0 | 13.5 | 11.0 | |
| Efficiency % | | 92.45 | 93.70 | 92.90 | 93.80 | 93.80 | 93.10 | 93.30 | 93.50 | 92.20 | 90.60 | 90.20 | 89.50 | 88.70 | 87.80 | 86.70 | 85.90 | 91.134 |

There is no reason why both power supply modules 2401 or 2402 must be of equal power. As another preferred embodiment, we have assigned power supply module 2401 to have 74% of total requirement and power supply module 2402 to have 26% of total requirement so they combined to 100%. When we repeated the computation, summarized in Table 3, taking into account whether both power supply modules 2401 or 2402 needs to be on at the same time, and when only one needs to be on, which one will yield the higher load ratio that leads to higher efficiency, and the result is a higher over all efficiency, 91.9% than two power supply modules of equal power capability. Power supply module 2401 is only active during 9 of 16 time segments. Power supply module 2402 is only active during 9 of 16 time segments. The reliability and the availability of the entire battery charge system is improved because the power supplies are turned on only 56% of the time.

TABLE 3

Efficiency computation for another preferred embodiment with two power supply modules

| | | Time Segment | | | | | | | | | | | | | | | | |
|---|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 | Overall |
| PS Module #1 | 74% capacity | 37.8 | 60.81 | 83.78 | 78 | 86 | 89.19 | 64.19 | 47.3 | 35.81 | off | off | off | off | off | off | off | |
| PS Module #2 | 26% capacity | off | off | off | 78.0 | 86.0 | off | off | off | off | 78.8 | 63.5 | 50.0 | 39.4 | 32.7 | 26.0 | 21.2 | |
| Efficiency % | | 90.5 | 92.8 | 93.9 | 93.8 | 93.8 | 93.7 | 93.05 | 91.5 | 90.3 | 93.9 | 93 | 92 | 90.55 | 90.1 | 89.5 | 88.9 | 91.956 |

It is the topology of the present invention that allows standard power supply modules to be used for high efficient battery charging operation. However, high efficient operation can only be realized with correct method of operation. The basic idea is to adaptively turn off some of the power supply modules so the charging power is contributed by fewer modules at higher efficiency at any given time. The power supply efficiency curves can be measured and characterized ahead of time. The battery charging power vs. time can also be measured and characterized ahead of time. The method of operation is to follow the battery charging power vs. time curve, and identify the optimal set of power supplies that needs to be turned on for each time period. It is important to realize that the time period needs not to be of equal duration.

Figure 6:
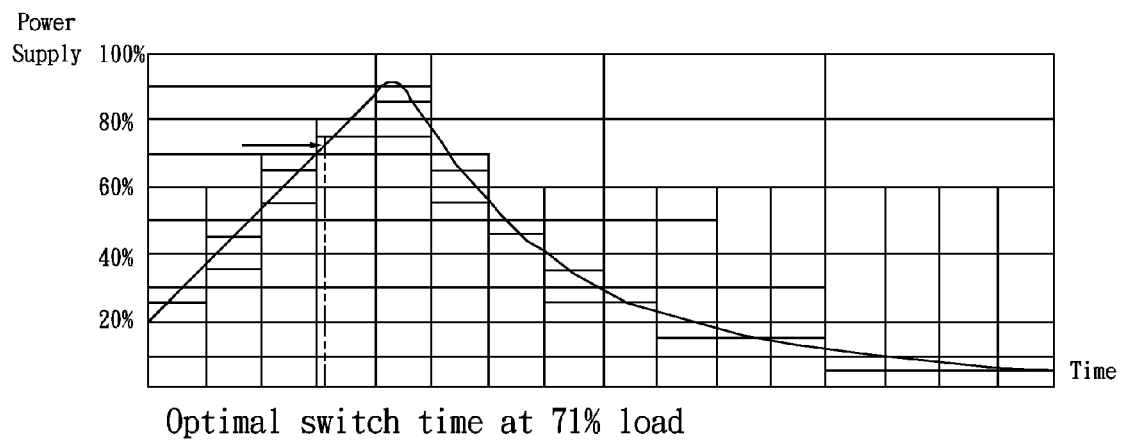
FIG. 6 shows the optimal power supply switching point for a preferred embodiment in which the two power supply modules' maximum power output rating are not the same.

As shown in FIG. 6, one preferred embodiment is to divide the battery charging cycle into equal time segments. For each time segment, compute the average power required and figure out the optimal number of power supply modules that must be activated in order to achieve the highest efficiency. The compute engine can either be in the battery charging system or outside the system, connected via network such as Ethernet, or buses such as RS-232 or CAN. The completed list for all segments can be loaded onto the controller 220 for the actual operation. Another preferred embodiment is to tabulate the power supply efficiency of all the module combinations, and the cross over power level when one combination started to lose efficiency over a fresh new combination. Using Table 3 from previous computation of a two power supply modules, one has 74% capacity and the other 26% capacity as an example.

Some point between time segment 3 to time segment 4, having only PS module #1 on is losing efficiency when compared to both modules on. Rather than using a fixed time point to do the switching, it is better to detect the cross-over power level and switch accordingly. The efficiency of load at 71% is at such a cross over point. Any higher, PS module #1 only loses efficiency, and both modules combined gains efficiency.

FIG. 6 shows that power supply switching should occur a little later than the time period dictates. The over all battery charging efficiency should increase using this preferred embodiment.

One may notice that for this preferred embodiment, for time segment 1 through 3, power supply module 2402 is off, and for time segment 14 through 16, power supply module 2401 is off. It is possible to initiate the charging operation of a new battery pack on time segment 14 without impact the charging operation of the current battery pack 9.

Another preferred embodiment is shown in FIG. 7 through FIG. 12, with 10 power supply modules 2401, 2402, . . . 24010, each has only 10% of the total requirement, each is connected via relay/switch banks 2241, 2242, . . . 22410 to two different loads, 91 and 92 or to open circuit. The relay/switch banks are under control by the controller 220. In step 31 of flow chart shown in FIG. 11, the power is first delivered to load 91 and the controller monitors the current output to load 91 via the ammeter 2221.

Figure 8:
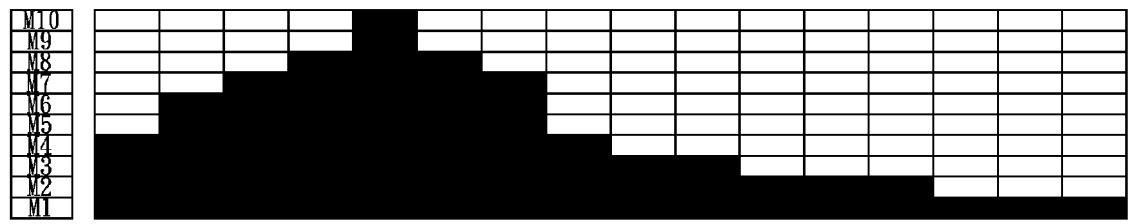
FIG. 8 shows an example of minimal switching of power supply modules in the FIG. 7 preferred embodiment of present invention.
Figure 11:
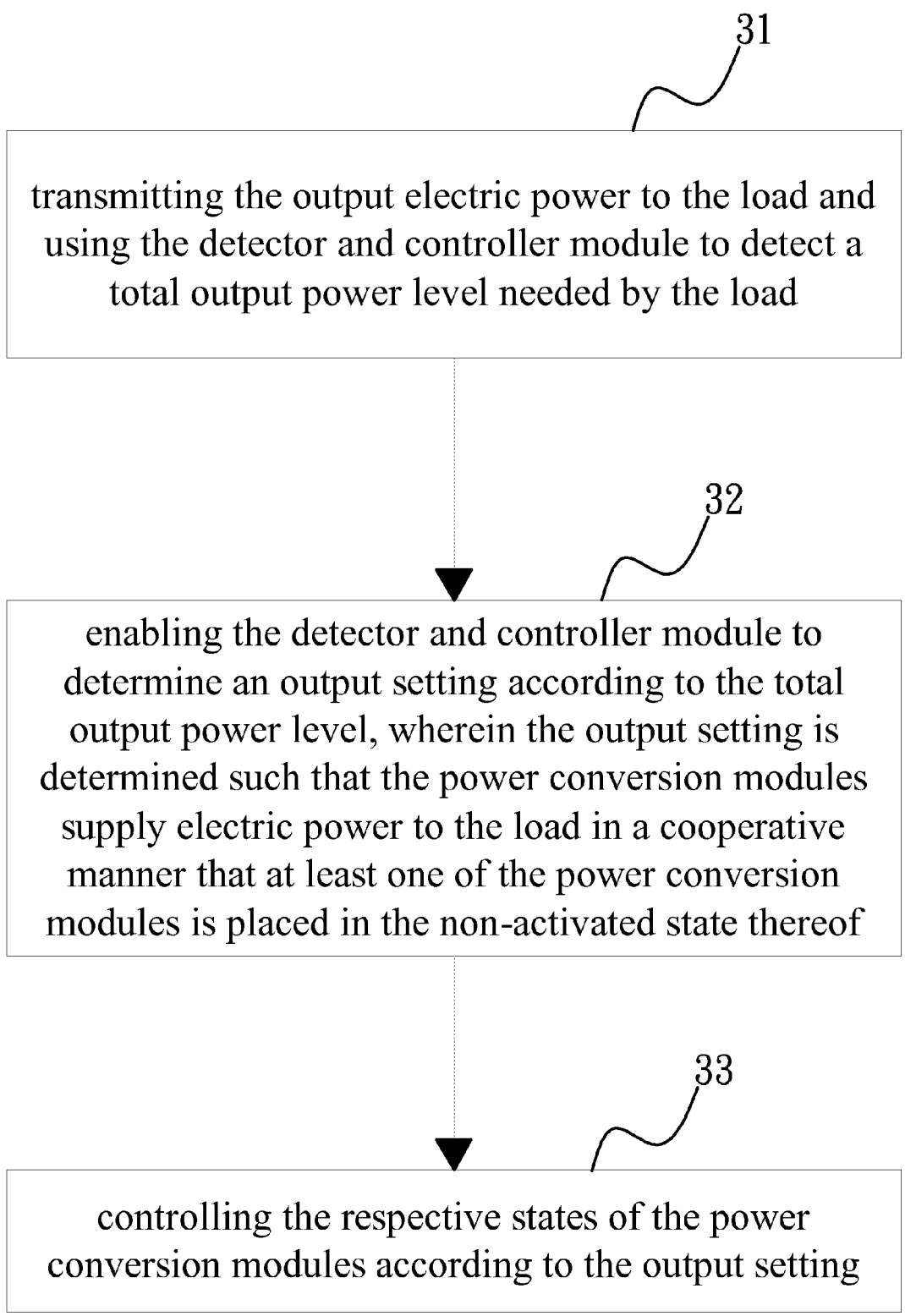
FIG. 11 is the process flow chart of a preferred embodiment of the present invention.

In step 32 of flow chart shown in FIG. 11, the controller 220 in the measurement/control module computes the best optimal number of power conversion modules to active, and in step 33 used and summarized in Table 4 and FIG. 8, de-active the appropriate number of power conversion modules to achieve the optimal performance. As shown in FIG. 8, for each time segment, just the right number of power supply modules are turned on, in order to arrive at the minimum activated power conversion modules that also satisfies the load requirement, also to yield the best power transfer efficiency. Therefore in this preferred embodiment of the present invention, as the load requirement drops 10% below the maximum combined total power transfer modules, at least one power transfer module can be safely de-activated, and the overall battery charge system efficient is at 93.4%, significantly higher than that can be achieved by prior art topology.

TABLE 4

Efficiency computation for a preferred embodiment with ten power supply modules

| | Time Segment | | | | | | | | | | | | | | | | |
|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | Overall |
| PS modules 1-10 each | 4 on | 6 on | 8 on | 9 on | 10 on | 8 on | 6 on | 4 on | 3 on | 3 on | 2 on | 2 on | 2 on | 1 on | 1 on | 1 on | |
| @10% capacity | 70.0 | 75.0 | 77.5 | 86.7 | 86.0 | 82.5 | 79.2 | 87.5 | 88.3 | 68.3 | 82.5 | 65.0 | 51.3 | 85.0 | 67.5 | 55 | |
| Efficiency % | 93.5 | 93.7 | 93.8 | 93.8 | 93.8 | 93.9 | 93.8 | 93.7 | 93.7 | 93.4 | 93.9 | 93.1 | 92 | 93.8 | 93.3 | 92.4 | 93.475 |

The embodiment for a topology with many identical power modules to select from, a method of operation is to select the module from the available pool with the highest efficiency. A list of efficiencies for all modules can be prepared ahead of time for this preferred operation. Another preferred embodiment is to select the power module with the lowest temperature from the available pool, since power supply efficiency increases with lower temperature.

Figure 9:
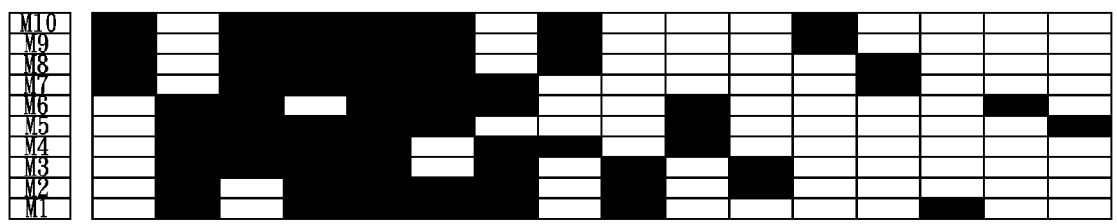
FIG. 9 illustrates how in the FIG. 7 preferred embodiment of present invention, power supply module can be reallocated for cooling, reliability and higher efficiency operation.
Figure 10:
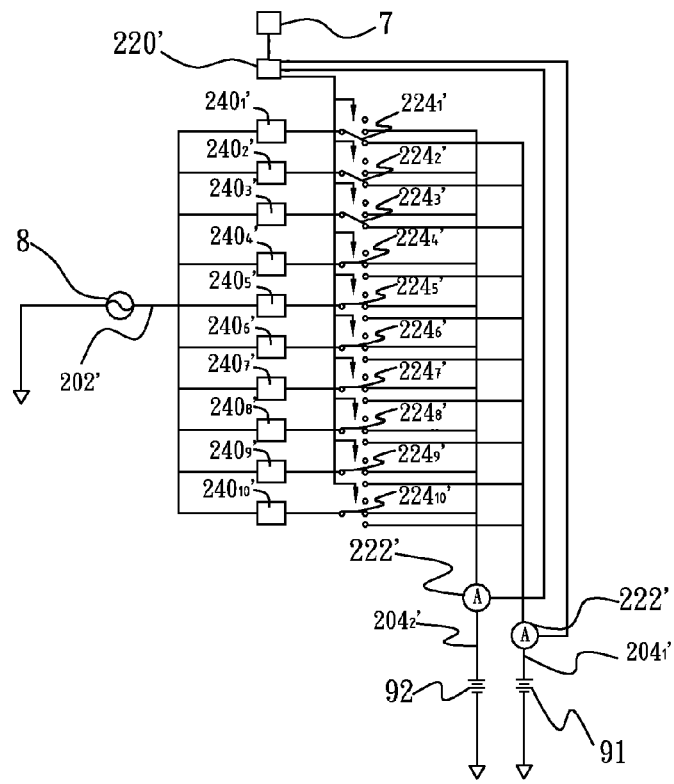
FIG. 10 shows an electronic circuit block diagram at time T as shown in FIG. 8, when the power supply modules are individually connected to 2 separate output loads under the direction of the power conversion system controller. This controller can further be controlled by an external host controller.

Additional benefit from this embodiment for a topology with many identical power modules is to further optimize the power supply utilization as shown in FIG. 9. Without reallocation, power supply module 1 is always on, its operating temperature the highest, and power supply module 10 is on 1/16 of the time and is the coolest. With proper redistribution, all power supply modules are on for only 7/16 of the time, and the on times are spaced apart as much as possible. The derived benefit is longer reliability across all modules and less heat generated for all modules that leads to even higher efficiency. Another derived benefit from this topology and method of operation is redundancy and graceful degradation in performance. Even with two out of ten power supply modules failed on a charger, the controller can extend the two affected time segments slightly and continue operation. Assuming the controller locks each power supply so its maximum output to only 90%, segment 4 needs to be extended by 20%, and segment 5 needs to be extended by 19.4%. The overall production charge cycle must be extended by only 2.4%. This is a significant advancement over prior art battery charging systems.

There are many control architectures that can realize the method of operation of this invention. As shown in FIG. 5 where a controller is connected to each power supply module via a control bus, is one example. There are many popular control bus standards such as CAN, RS-232, RS-488, Firewire, and USB that can be used. It is also possible to have a controller per power supply module, and to have a communication structure that allows all modules to select one master to be in charge. It is also possible to have a host computer outside of the battery charger that controls all the power supply modules and the battery packs. Since all these control architectures are well known in the field, and its architecture only periphery to this invention, its details are omitted for clarity.

Figure 7:
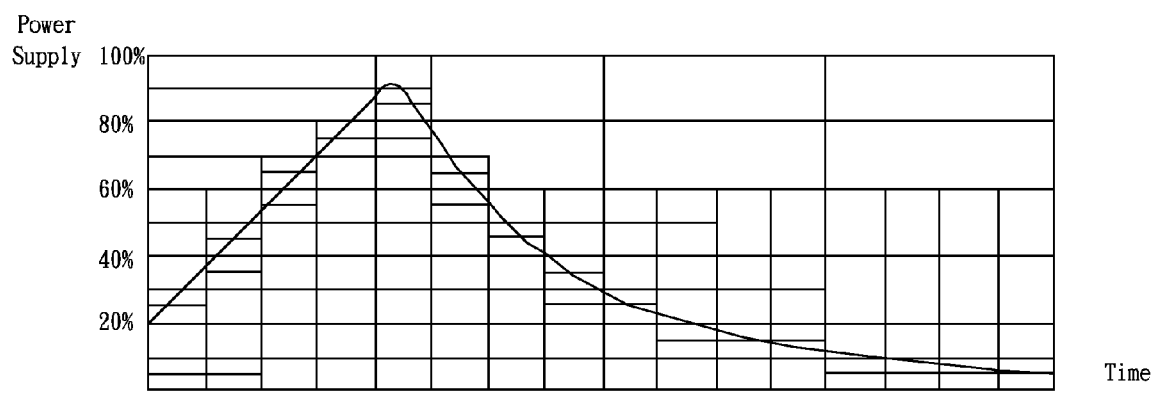
FIG. 7 is the load requirement vs. time graph of another preferred embodiment of present invention power conversion system, in which all 10 power supply modules are of the same maximum power output rating.

Furthermore, when the first battery pack 91 arrived at time point 9 as shown In FIG. 7, its charging requirement can be fulfilled by 3 charging modules 2401', 2402', 2403' only. Taking advantage of this, the controller 220' switches the output of power supply module 2401', 2402', 2403', to output 2041', for connection to battery pack 91. Just after time segment 8, the controller 220' switches the output of power supply module 2405', 2406', ... 24010', to output 2042', for connection to battery pack 92, to initiate charging of this new pack. Just after the end of time segment 16, the charging operation of battery pack 91 is now complete, the controller switches the output of all the power supply module 2401', 2402', ... 24010', to output 2042', for connection to battery pack 92 to continue charging operation. The effective cycle time is reduced by about 19%, and the battery pack set up time does not affect the throughput. This is a significant advancement over prior art systems. Furthermore, this invention can be carried forward into a charging system consisting of N power supplies and M charging points in which the controller will dynamically distribute any power configuration available to the charging system to each charging point depending on current usage needs and power requirements. The configuration could provide evenly distributed power to each charging point at night for general low speed charging, and then the same charging system can be reconfigured to deliver concentrated power to a few charging points during the day for fast charging. In this configuration, the charging points can be physically separated from the power supplies by 20 meters or more. Additional voltage sensing wires from the controller to each charging point can ensure the accuracy and control over the voltage delivered to the load at the charging point.

Moreover, by being able to dynamically alter and allocate each power supply module's output, the charging system can be made to be fail safe and fail soft for any charging station configuration. This will guarantee maximum system uptime and availability. Fail safe operation can be conducted by adding extra power supply modules to exceed any charging system's stated requirements, thus allowing any failed power supply module to be automatically replaced with an extra power supply module instantaneously via a system controller. Furthermore, all power supply modules in the charging system can be installed with hot plug/unplug capabilities, done by installing a switch or relay on the input and or output of the power supplies. Charging systems utilizing this hot swapping system of power supply modules can optionally have any of its power supply modules swapped out without having to alter the activity of any other power supply module.

DC to DC Battery Charging System

Figure 1:
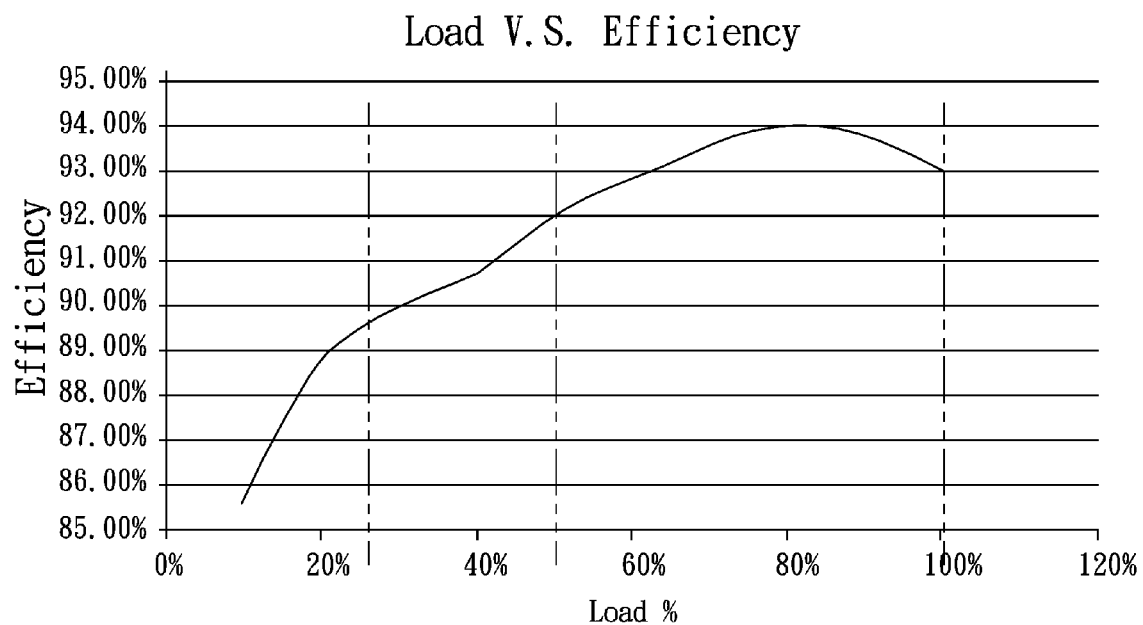
FIG. 1 is a graph of load, or power output, vs. power transfer efficiency for a resonant converter power supply.
Figure 2A:
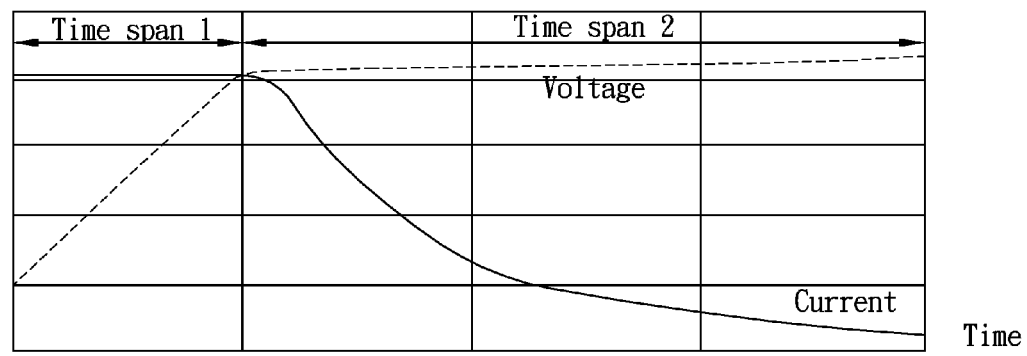
FIG. 2a is a graph of current and voltage of a Lithium ion battery being charged vs. time.
Figure 2B:
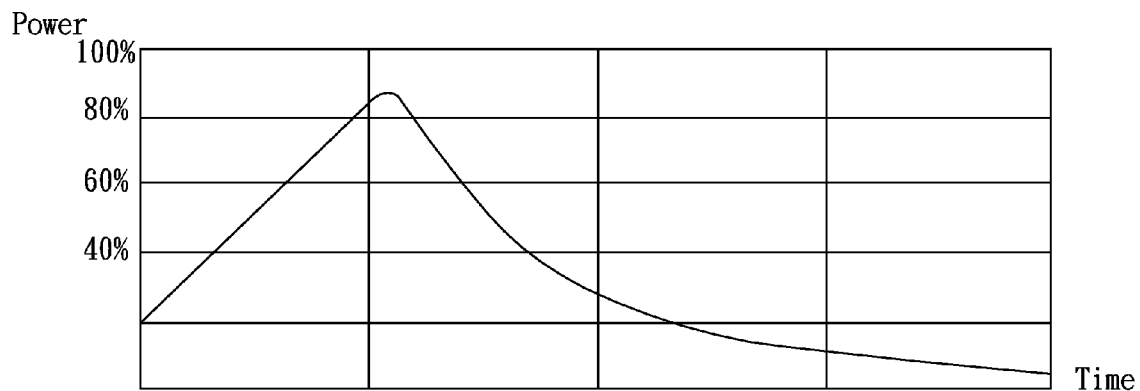
FIG. 2b is a graph of charging power delivered to a Lithium ion battery vs. time.
Figure 3:
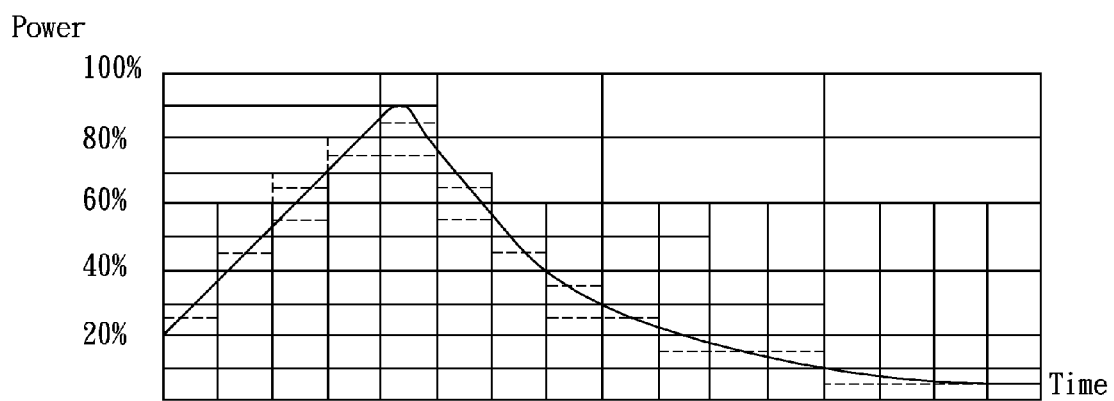
FIG. 3 divides the charging cycle into 16 segments for efficiency computation.

FIG. 12 is a graph of load, or power output, vs. power transfer efficiency for a DC (400V)-DC power supply. FIG. 13 is the corresponding circuit block diagram. The battery charging power over time, as shown in FIG. 2b stays the same. Electric cars can be charged from DC charging stations. The DC to DC power supply efficiency is better than AC to DC power supply. But the efficiency still varies with respect to load conditions as widely. By replacing the transfer efficiency curve and redo the calculations according to present invention, adaptive control schemes can be established that leads to significant efficiency gains for DC to DC battery charging systems with a plurality of DC to DC power supply modules and a controller.

In this embodiment, the controller to accept command and data via bus 90" from the battery packs 9". If the battery packs 9" internal temperature is too high due to charging, the battery pack 9" can send command and data to the controller 220" to request a reduction in charging power. The controller 220" can set a new, lower power level, adaptively identify the best efficient operating configuration and continue operation.

Power Conversion Systems for Data Center Application

A computer data center power supply installation often taking into account future expansion requirement. Often the power supply capacity is too large for optimal, efficient operation. FIG. 14 is a graph of load, or power output, vs. power transfer efficiency for a DC (400V)-AC power supply. Please note the efficiency varies with respect to load conditions widely.

FIG. 15 shows a sample server loading in a big company across the work day. In the data center application, we are seeing the same large fluctuations in electric load requirement as battery charging. The topology and the method of operation of the present invention can be applied in this case for significant power savings. The difference in this application is the present invention can be used in all power conversion steps from the grid to the server. Multiple power conversion modules can be deployed in each step. Power conversion modules that are shut off serves as redundant back up modules, significantly enhance the reliability of the entire power system. By reallocating active modules in a timing cycle, all modules get to have time off, extending module life. Furthermore, System up time, according to present invention, is much better than conventional N+1 or 2(N+1) redundant power supply architecture, since the faulty supplies can be placed on an inactive list and never be used. They also run cooler, which adds to reliability and power transfer efficiency. We have given different application scenarios to demonstrate that advantages of the present invention detailed in the battery charging system is applicable to all power conversion system.

The foregoing description of the illustrated embodiments of the present invention is by way of example only, and other variations and modifications of the above-described embodiments and methods are possible in light of the foregoing teaching. For example, battery packs could be used for solar energy or fuel cell energy storage, controller could be implemented in each power supply module that is networked together, or a remote host via local area network. The embodiments described herein are not intended to be exhaustive or limiting. The present invention is limited only by the following claims.

What is claimed is:

1. A power conversion method for use in a power conversion system for receiving an input electric power and converting the input electric power into an output electric power which is to be output to a load, wherein the power conversion system comprises a plurality of power conversion modules operating in a cooperative manner and a detector controller module; wherein each of power conversion modules has a maximum output power level and has a non-activated state and an activated state where the corresponding power conversion module has a conversion efficiency varying according to a ratio of an output power level that is to be supplied to the load over the maximum output power level; the power conversion method comprising the steps of:

a) characterizing a battery charging voltage and current for each of a plurality of time segments, relative to a battery to be charged;
  b) transmitting the output electric power to the battery with a total output power level for each of the plurality of time segments being in accordance with the characterized battery charging voltage and current;
  c) enabling the detector and controller module to determine an output setting according to the total output power level, wherein the output setting is determined such that the power conversion modules supply electric power to the load in a cooperative manner that at least one of the power conversion modules is placed in the non-activated state thereof during at least one of the plurality of time segments; and d) controlling the respective states of the power conversion modules according to the output setting, wherein each power conversion module of the plurality of power conversion modules has a different power rating, and wherein one of the plurality of power conversion modules is placed in the activated state thereof as a result of the one of the plurality of power conversion modules having a lowest temperature among available ones of the plurality of power conversion modules.

2. The power conversion method according to claim 1, wherein the output setting in step c) is determined such that the power conversion modules are activated in a manner such that the power conversion system has a minimum number of the power conversion modules placed in the activated states thereof and the sum of the maximum output power levels of all the power conversion modules placed in the activated states is higher than the total output power level needed by the load.

3. The power conversion method according to claim 1, wherein when the load comprises a plurality of load components and when the power conversion modules are placed in step c) to provide sufficient electric power to support the total output power level needed by the load, the step d) further comprises a sub-step d1) of dividing the power conversion modules into a plurality of sections corresponding to the respective load components.

4. The power conversion method according to claim 1, wherein when the load comprises a temperature sensor and a rechargeable battery provided with a feedback bus for outputting a signal indicative of a temperature measured by the temperature sensor, the step c) further comprises a sub-step c1) of using a corresponding bus corresponding to the feedback bus to receive the temperature signal and transmit the temperature signal to the detector and controller module.

5. The power conversion method of claim 1, wherein each of the plurality of power conversion modules has a differing rated power.

6. The power conversion method of claim 1, wherein the each of the plurality of power conversion modules has a same rated power.

7. The power conversion method of claim 1, wherein the plurality of power conversion modules includes a shared bridge rectifier.

8. The power conversion method of claim 1, wherein the plurality of power conversion modules includes a shared electromagnetic interference (EMI) filter.

9. The power conversion method of claim 1, further comprising:
characterizing power supply efficiency curves of the plurality of power conversion modules, wherein the combination of activated states and non-activated states is based on the power supply efficiency curves.

10. The power conversion method of claim 1, further comprising:
determining an average power required for each of the plurality of time segments, wherein the combination of activated states and non-activated states for each of the plurality of time segments is based on the average power required for each of the plurality of time segments.

11. The power conversion method of claim 1, further comprising:
determining at least one crossover power level of power transfer efficiency curves of differing combinations of activated states and non-activated states of the plurality of power conversion modules; and
applying the at least one crossover power level when switching between the differing combinations of activated states and non-activated states.

12. The power conversion method of claim 1, further comprising:
redistributing allocation of the activated states and the non-activated states among the plurality of power conversion modules so as to reduce operating time of at least one of the plurality of power conversion modules.

13. The power conversion method of claim 1, further comprising:
extending a time of one of the plurality of time segments in response to a failure of a one of the plurality of power conversion modules.

14. The power conversion method of claim 1, further comprising:
distributing power from the plurality of power conversion modules to a plurality of batteries including the battery.

15. The power conversion method of claim 1, further comprising:
adding to the power conversion system an extra power supply module having hot plug and unplug capability.

16. The power conversion method of claim 1, further comprising:
retaining at least one of the power conversion modules in the non-activated state as one of a plurality of backup modules.

17. The power conversion method of claim 1, further comprising:
allocating at least one of a plurality of backup power conversion modules to the activated state in a timing cycle.

18. The power conversion method of claim 1, further comprising:
supplying electrical power to the power conversion modules from solar energy.

19. The power conversion method of claim 1, further comprising:
supplying electrical power to the power conversion modules from at least one fuel cell.

* * * * *

UNITED STATES PATENT AND TRADEMARK OFFICE
CERTIFICATE OF CORRECTION

PATENT NO. : 8,803,485 B2  
APPLICATION NO. : 12/732162  
DATED : August 12, 2014  
INVENTOR(S) : Charles Chuang, Hsien-His Juan and David YuanJei Tse Page 1 of 1

It is certified that error appears in the above-identified patent and that said Letters Patent is hereby corrected as shown below:

On the Title Page, Item (73): "Assignee: Alieva, Inc." should read --Assignee: Atieva, Inc.--.

Signed and Sealed this  
Twenty-first Day of October, 2014

Michelle K. Lee  
*Deputy Director of the United States Patent and Trademark Office*